J. P. Watson,
Cistern Cut Off.
No. 100,474.   Patented Mar. 1, 1870.
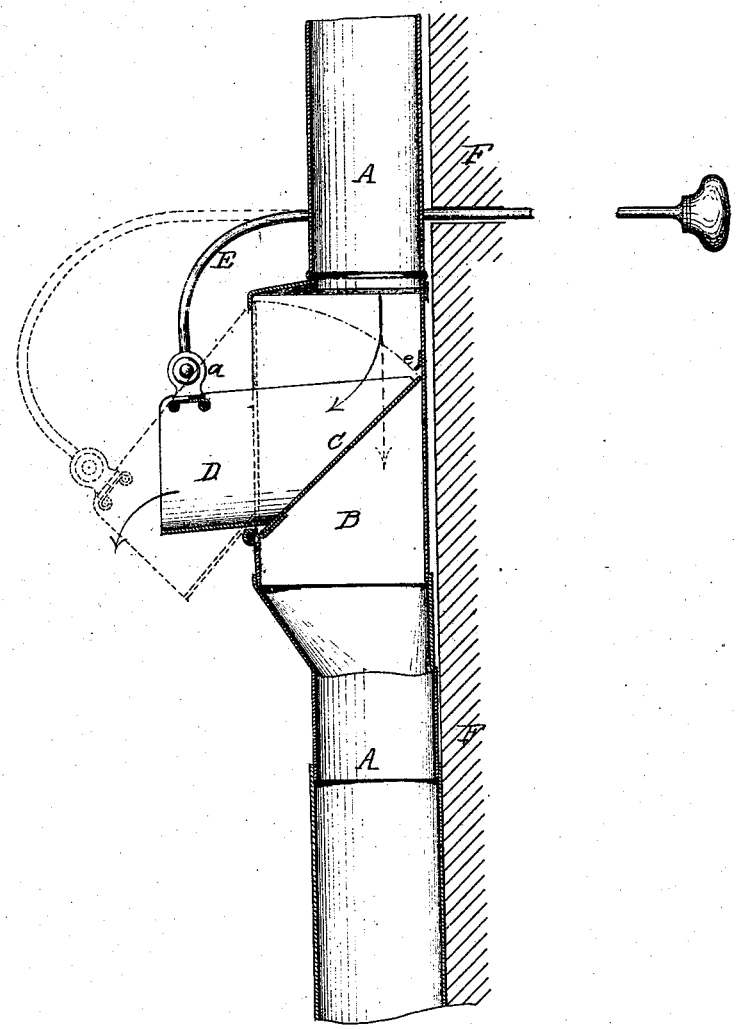
Witnesses:
Phil. T. Dodge
E. J. Sommer
Inventor:
J. P. Watson
by Dodge & Munn
his attys

United States Patent Office.

J. P. WATSON, OF ROCHESTER, MINNESOTA.

Letters Patent No. 100,474, dated March 1, 1870.

IMPROVEMENT IN CISTERN CUT-OFFS.

The Schedule referred to in these Letters Patent and making part of the same.

*To all whom it may concern:*

Be it known that I, J. P. WATSON, of Rochester, in the county of Olmsted, and State of Minnesota, have invented certain new and useful Improvements in Cut-Off for Cistern-Feeders and other water conductors; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention relates to a cut-off for cistern-feeders and other water conductors; and It consists in a novel manner of constructing the same, and in providing it with a handle, whereby it can be operated from within the building.

The drawing represents a vertical section through the center of my device.

A is the water-conductor, having a rectangular enlargement or chamber, B, the front side, C, of which is hinged at its lower edge, so that it may be turned inward, as shown.

To the front or outside of the hinged side or door D, I secure a chute or spout, D, having a downward inclination, as shown, and across the back wall of the chamber B, I secure a ledge, e.

When the hinged side is turned inward, it strikes against the back wall of the chamber below the ledge e, and thus forms a tight partition, which cuts off the flow of water down the pipe A, and causes it to pass through chute D, which discharges it outside.

To the outer end of the chute I secure a cross-bar, provided with an ear, a, and to this ear I connect a curved rod, E, which passes through the wall F to the inside of the building, so that persons within can, by operating this rod, open or close the cut-off located outside.

The rod E may be curved so as to cause its end to conform to the movement of the ear a, or it may be passed straight through the wall and its outer end made elastic, so as to bend, or a slotted arm may be substituted for the ear a, and the end of the rod allowed to play in the slot.

When the door is turned up in its normal position, it closes the side of the chamber and allows the free passage of the water down the pipe.

My device, thus constructed, presents a simple and efficient cut-off for the purpose of regulating the supply or feed of cisterns that can be operated from indoors, thus obviating the necessity of the operator exposing himself during inclement weather.

Having thus described my invention,

What I claim is—

1. A water-conductor, having a chamber, B, with one of its sides, C, hinged and provided with a spout, D, all constructed and arranged as herein described, and for the purpose set forth.

2. The combination of hinged side C, spout D, cross-bar provided with ear a, and curved rod E, when constructed and arranged as described.

J. P. WATSON.

Witnesses:
J. A. AUSTIN,
T. H. BLISS.